United States Patent
Onoda

(10) Patent No.: US 8,107,716 B2
(45) Date of Patent: Jan. 31, 2012

(54) DEFECT DETECTING APPARATUS AND METHOD

(75) Inventor: Yuji Onoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 682 days.

(21) Appl. No.: 12/234,667

(22) Filed: Sep. 21, 2008

(65) Prior Publication Data

US 2009/0087079 A1 Apr. 2, 2009

(30) Foreign Application Priority Data

Sep. 27, 2007 (JP) .................................. 2007-252006

(51) Int. Cl.
*G06K 9/00* (2006.01)
(52) U.S. Cl. ........................................................ 382/141
(58) Field of Classification Search ........................ None
See application file for complete search history.

(56) References Cited

U.S. PATENT DOCUMENTS 6,075,880 A * 6/2000 Kollhof et al. ................ 382/141
2005/0232476 A1* 10/2005 Hayakawa et al. ........... 382/141

FOREIGN PATENT DOCUMENTS

JP 2002-139454 A 5/2002

* cited by examiner

*Primary Examiner* — Tu Nguyen
(74) *Attorney, Agent, or Firm* — Sughrue Mion, PLLC

(57) ABSTRACT

A front side surface of a cover glass of a solid state imaging device is focused, and a front side image is captured. Next, a rear side surface of the cover glass is focused, and a rear side image is captured. The front side image and the rear side image are combined with each other to create a composite image. A first threshold value is set for each pixel in the composite image by dynamic thresholding. An image composed of pixels whose gray values exceed the first threshold value is identified as a defect candidate image. The maximum gray value of the defect candidate image is multiplied by a constant rate to set a second threshold value. An image composed of pixels whose gray value is less than the second threshold value is eliminated as a blurred image from the defect candidate image.

12 Claims, 8 Drawing Sheets

DEFECT DETECTING APPARATUS AND METHOD

FIELD OF THE INVENTION

The present invention relates to a defect detecting apparatus and method for detecting defects of a transparent member such as a cover glass of a solid state imaging device.

BACKGROUND OF THE INVENTION

An electronic camera such as a digital camera incorporates a solid state imaging device for photoelectrically converting subject light into an electric signal. The solid state imaging device includes a solid state imaging element such as a charge-coupled device (CCD) and a complementary metal-oxide semiconductor (CMOS), a package for housing the solid state imaging element (bare chip), and a cover glass attached to the package for covering an imaging surface of the solid state imaging element.

When the cover glass has defects such as stain, scratch, and incorporation of foreign materials, a part of the subject light is scattered or blocked by these defects, and not able to enter the imaging surface of the solid state imaging element. Therefore, before the solid state imaging device is mounted to the electric camera, the cover glass thereof is subjected to defect inspection. In the defect inspection, in general, while light is applied to the cover glass, the cover glass is captured (imaged) by a camera, and based on the captured image of the cover glass, defects are detected (see Japanese Patent Laid-Open Publication No. 2002-139454).

When the cover glass is captured by the camera in the defect inspection, at first, a focal length of the camera is adjusted, and then a front side surface of the cover glass is focused and captured. Next, a rear side surface of the cover glass is focused and captured in the same manner. Thereby, based on an image of the front side surface of the cover glass (hereinafter referred to as front side image) and an image of the rear side surface thereof (hereinafter referred to as rear side image), the defects of the cover glass are detected.

However, when the front and rear side surfaces of the cover glass are focused and captured respectively, if the depth of field is shallow, the following problems may occur. For example, in a case where a minute scratch or the like which is not considered as a defect in the defect inspection (hereinafter, referred to as "allowable defect") is caused on the front side surface of the cover glass, and the rear side surface of the cover glass is focused and captured, the allowable defect appears as a blurred image on the rear side image. When the blurred image caused by the allowable defect is judged as a defect, even though the cover glass should be judged as a non-defective product in a normal case, the cover glass is sometimes considered as a defective product. As a result, unnecessary inspection is performed, and thereby the productivity is decreased.

SUMMARY OF THE INVENTION

In view of the above, an object of the present invention is to provide a defect detecting apparatus and method for surely detecting defects without performing unnecessary inspection.

To achieve the above and other objects, a defect detecting apparatus of the present invention includes: an imaging device for focusing and imaging each surface; a combining device for combining images of the surfaces obtained by the imaging device so as to create a composite image; an eliminating device for eliminating at least one blurred image from the composite image, the blurred image being caused by a defect which resides on one of the surfaces and appears on the other of the surfaces; and a defect detecting device for detecting the defect based on the composite image from which the blurred image is eliminated. The surface to be inspected includes a front side surface and a rear side surface of a transparent member.

The eliminating device includes: a defect candidate image identifying device for identifying a defect candidate image containing an image of the defect and the blurred image in the composite image; and a blurred image eliminating device for eliminating the blurred image from the defect candidate image.

The defect candidate image identifying device sets a first threshold value for each pixel in the composite image using dynamic thresholding and identifies an area composed of pixels whose gray values exceed the first threshold value as the defect candidate image.

The blurred image eliminating device detects a maximum gray value of the defect candidate image, and sets a second threshold value by multiplying the maximum gray value by a constant rate, and then eliminates an area composed of pixels whose gray values are less than the second threshold value as the blurred image from the defect candidate image.

The eliminating device further includes: a maximum gray value pixel detector for detecting a pixel having a maximum gray value among pixels in the defect candidate image; and an image divider for dividing the defect candidate image into a first defect candidate image and a second defect candidate image, the first defect candidate image being a predetermined area around the maximum gray value pixel, and the second defect candidate image being an area other than the first defect candidate image. The blurred image is eliminated from each of the first defect candidate image and the second defect candidate image by the blurred image eliminating device. The defect is a spot defect, a scratch defect, or a stain defect.

A defect detecting method of the present invention includes the steps of: focusing and imaging each surface to be inspected; combining images of the surfaces obtained by the imaging step so as to create a composite image; eliminating at least one blurred image from the composite image, the blurred image being caused by a defect which resides on one of the surfaces and appears on the other of the surfaces; and detecting the defect based on the composite image from which the blurred image is eliminated.

The eliminating step includes the steps of: identifying a defect candidate image containing an image of the defect and the blurred image in the composite image; eliminating the blurred image from the defect candidate image.

The defect candidate image identifying step includes the step of setting a first threshold value for each pixel in the composite image by dynamic thresholding and the step of identifying an area composed of pixels whose gray values exceed the first threshold value as the defect candidate image.

The blurred image eliminating step includes the step of detecting a maximum gray value of the defect candidate image, the step of setting a second threshold value by multiplying the maximum gray value by a constant rate, and the step of eliminating an area composed of pixels whose gray values are less than the second threshold value as the blurred image from the defect candidate image.

The eliminating step further includes the steps of: detecting a pixel having a maximum gray value among pixels in the defect candidate image; and dividing the defect candidate image into a first defect candidate image and a second defect candidate image, the first defect candidate image being a predetermined area around the maximum gray value pixel, and the second defect candidate image being an area other than the first defect candidate image. The blurred image is eliminated from each of the first defect candidate image and the second defect candidate image. The defect is a spot defect, a scratch defect, or a stain defect.

According to the present invention, it is possible to surely detect defects without performing unnecessary inspection by eliminating a blurred image from a composite image obtained by combining images of the respective surfaces to be inspected.

BRIEF DESCRIPTION OF THE DRAWINGS

One with ordinary skill in the art would easily understand the above-described objects and advantages of the present invention when the following detailed description is read with reference to the drawings attached hereto.

DESCRIPTION OF THE PREFERRED EMBODIMENTS

First Embodiment

Figure 1:
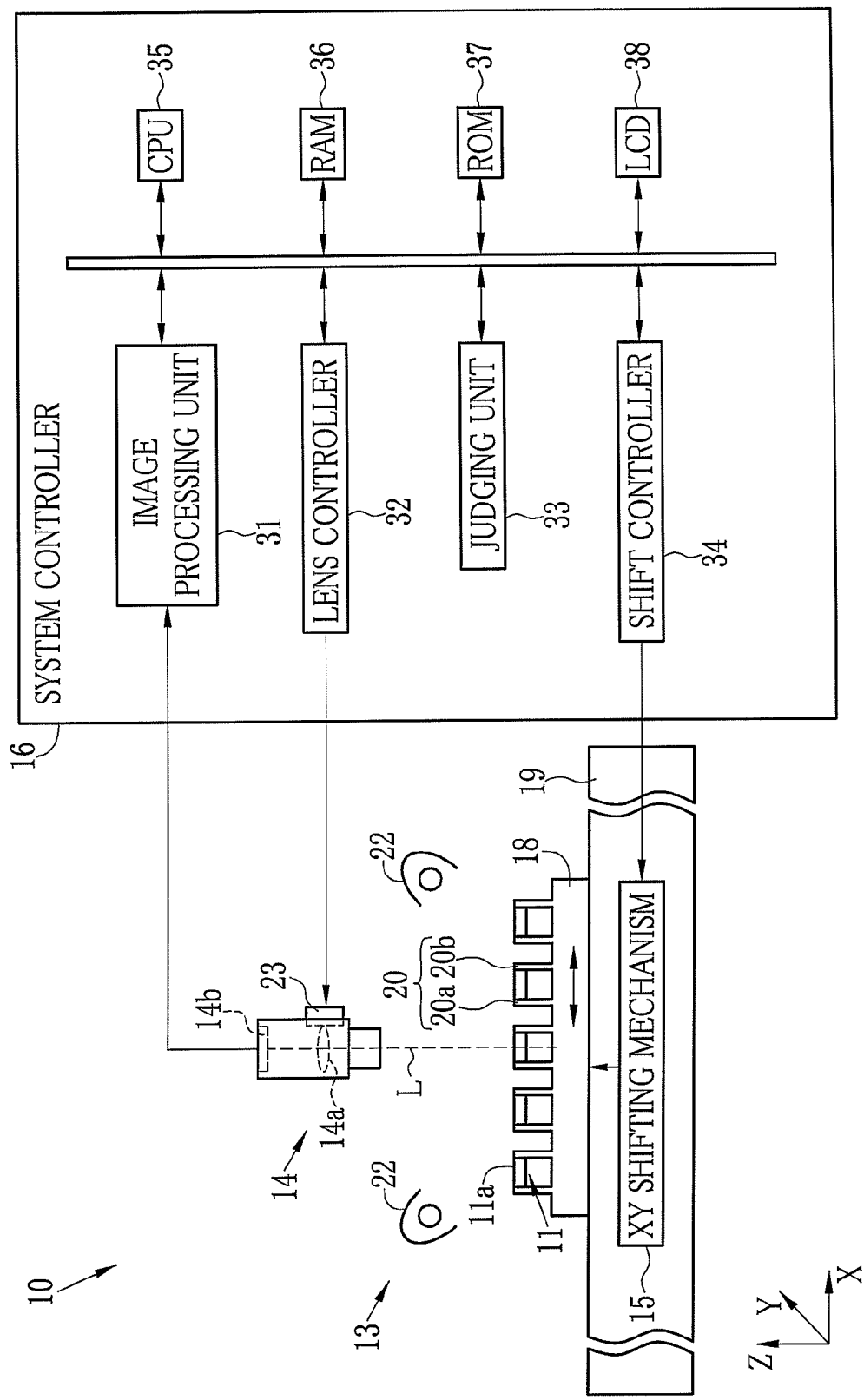
FIG. 1 is a schematic diagram of a defect detecting apparatus according to a first embodiment of the present invention.

As shown in FIG. 1, a defect detecting apparatus 10 detects defects on a cover glass 11a of a solid state imaging device 11. The defects on the cover glass 11a include a spot defect (defect caused by incorporation of foreign materials to have roughness on the surface), a scratch defect, a stain defect, and the like.

The defect detecting apparatus 10 includes an inspection stage 13, a camera 14, an XY shifting mechanism 15, and a system controller 16. The inspection stage 13 includes a jig 18 and a base 19. The jig 18 is movable on the base 19 in X and Y directions. A plurality of clamps 20 are disposed on an upper surface of the jig 18 in a matrix fashion in the X and Y directions. Each of the clamps 20 includes a pair of pins 20a and 20b. The pair of pins 20a and 20b holds the solid state imaging device 11 horizontally such that the cover glass 11a faces upward. Further, above both right and left sides of the jig 18, a light source 22 is respectively disposed. Light from each of the light sources 22 is obliquely applied to the cover glass 11a.

An optical axis L of the camera 14 is sequentially adjusted to a center of the cover glass 11a at each inspection target position. An imaging optical system of the camera 14 includes a focus lens 14a, and the focus lens 14a is driven by a lens motor 23 to move in a direction of the optical axis L. A lens controller 32 in the system controller 16 causes a driver (not shown) to drive the lens motor 23. An imaging device 14b (CCD area sensor) is disposed behind the focus lens 14a, and the imaging device 14b photoelectrically converts the light from the optical imaging system to an imaging signal. The depth of field of the camera 14 is set shallow sufficiently, and thereby only one of the front and rear side surfaces of the cover glass 11a is focused. Since the depth of field of the camera 14 is set shallow sufficiently, it becomes easy to make the distinction between the true defect and the others.

The cover glass 11a is captured (imaged) by the camera 14 as follows. At first, the focus lens 14a is moved to focus on the front side surface of the cover glass 11a, and the image is captured. A signal obtained by the capturing (hereinafter referred to as front side imaging signal) is sent to an image processing unit 31 in the system controller 16. Upon completion of the capturing of the front side surface of the cover glass 11a, the focus lens 14a is moved to focus on the rear side surface of the cover glass 11a, and the image is captured. A signal obtained by the capturing (hereinafter referred to as rear side imaging signal) is sent to the image processing unit 31.

Although not shown, the optical imaging system of the camera 14 includes an aperture stop, a zoom lens, and the like, in addition to the focus lens. As the optical imaging system, there are telecentric lens, closed circuit television (CCTV) lens, and the like. In order to prevent occurrence of distortion in the periphery of the captured image due to the movement of the focus lens or the like, the telecentric lens is preferably used. Moreover, although the front side surface of the cover glass 11a is captured first and then the rear side surface thereof is captured, on the contrary, it is also possible to capture the rear side surface of the cover glass 11a first and then capture the front side surface thereof. Although the front side imaging signal and the rear side imaging signal are sent to the image processing unit 31 directly in this embodiment, it is also possible to store the front side imaging signal and the rear side imaging signal in a memory such as random access memory (RAM) once and then sent them to the image processing unit 31.

A shift controller 34 in the system controller 16 causes a driver (driver) to drive the XY shift mechanism 15. The shift controller 34 causes the XY shift mechanism 15 to move the jig 18 in the X or Y direction by a predetermined distance. Thereby, the center of each of the cover glasses 11a is adjusted to the optical axis L of the camera 14. The distance of the jig 18 moved by the XY shifting mechanism 15 corresponds to a distance between the adjacent clamps 20 on the jig 18.

The system controller 16 includes the image processing unit 31, the lens controller 32, a judging unit 33, the shift controller 34, a central processing unit (CPU) 35, a RAM 36, a read-only memory (ROM) 37, and a liquid crystal display (LCD) 38.

The image processing unit 31 subjects the front side imaging signal and the rear side imaging signal sent from the camera 14 to an enhancement processing such as a differential processing. Further, the image processing unit 31 creates the front side image based on the front side imaging signal, and the rear side image based on the rear side imaging signal.

Figure 2A:
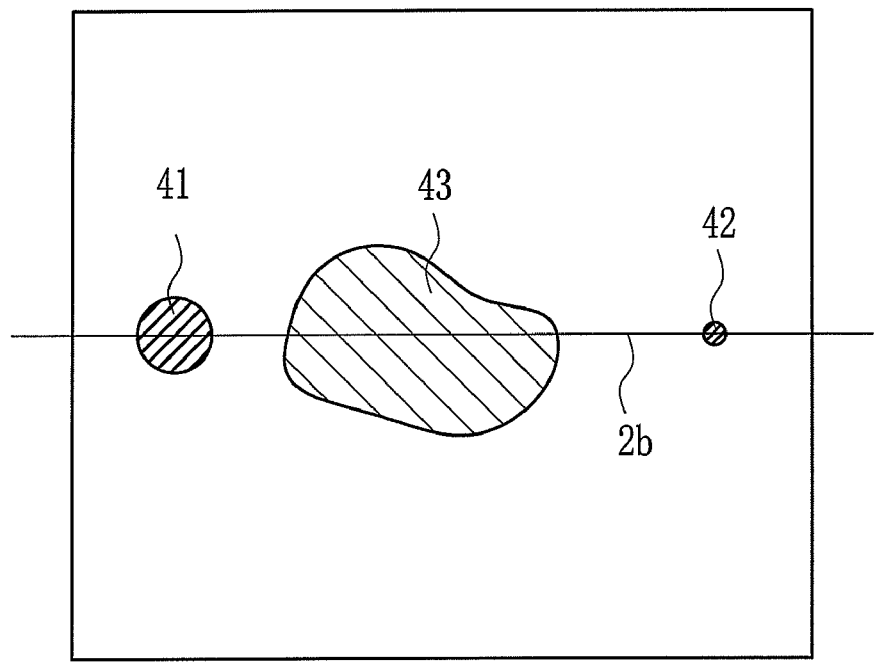
FIG. 2A is an explanation view illustrating a front side image of a cover glass.
Figure 2B:
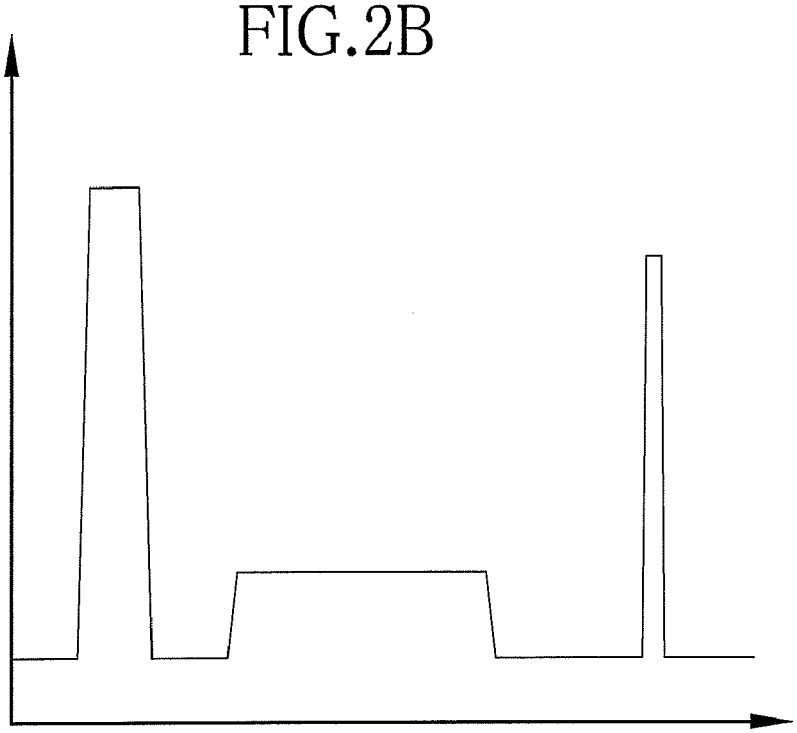
FIG. 2B is a graph showing gray values of pixels on a line 2b in the front side image.
Figure 3A:
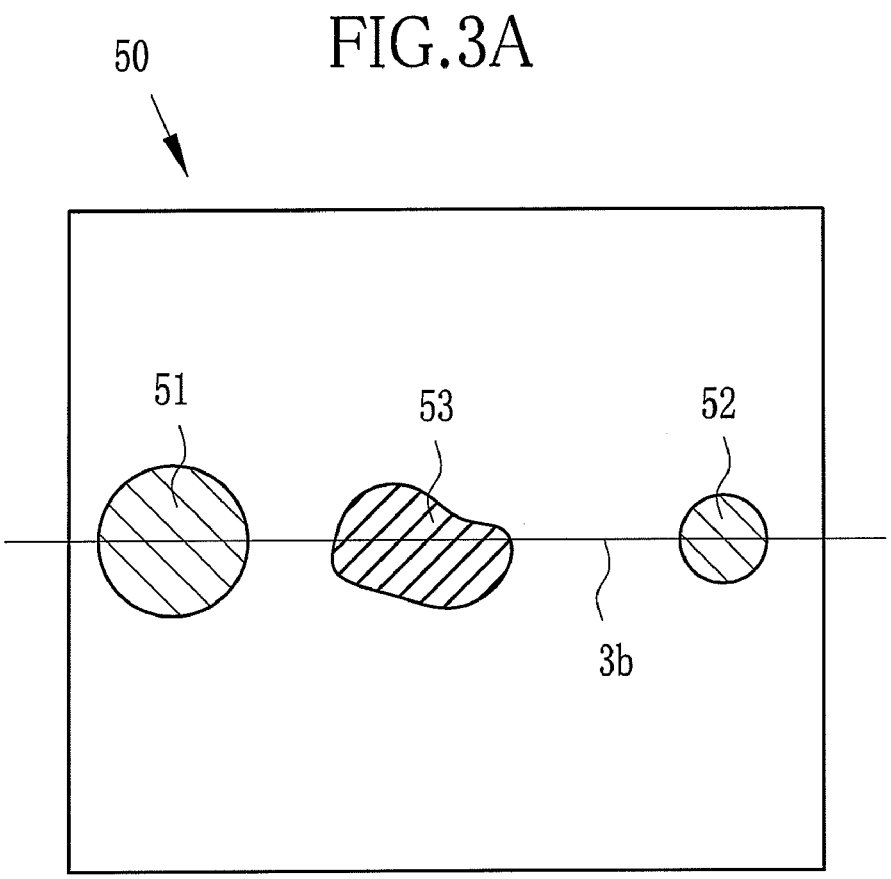
FIG. 3A is an explanation view illustrating a rear side image of the cover glass.
Figure 3B:
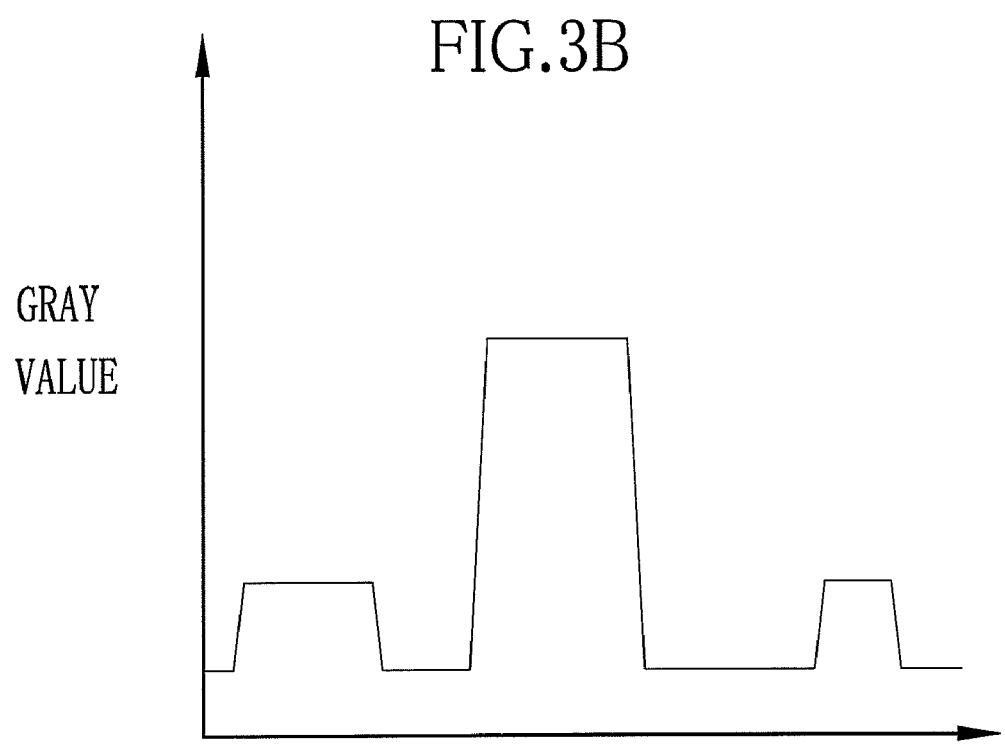
FIG. 3B is a graph showing gray values of pixels on a line 3b in the rear side image.

As shown in FIG. 2A, on a front side image 40, there are recorded a spot defect image 41 showing the spot defect, an allowable defect image 42 showing the defect which is not judged as defect (hereinafter referred to as allowable defect), and a blurred image 43 caused by the stain defect on the rear side surface of the cover glass 11a. FIG. 2B shows the gray values of the pixels on a line 2b in the front side image 40. As shown in FIG. 3A, on a rear side image 50, there are recorded a blurred image 51 caused by the spot defect, a blurred image 52 caused by the allowable defect, and a stain defect image 53 caused by the stain defect, all of which are on the front side surface of the cover glass 11a. FIG. 3B shows the gray values of the pixels on a line 3b in the rear side image 50.

Figure 4A:
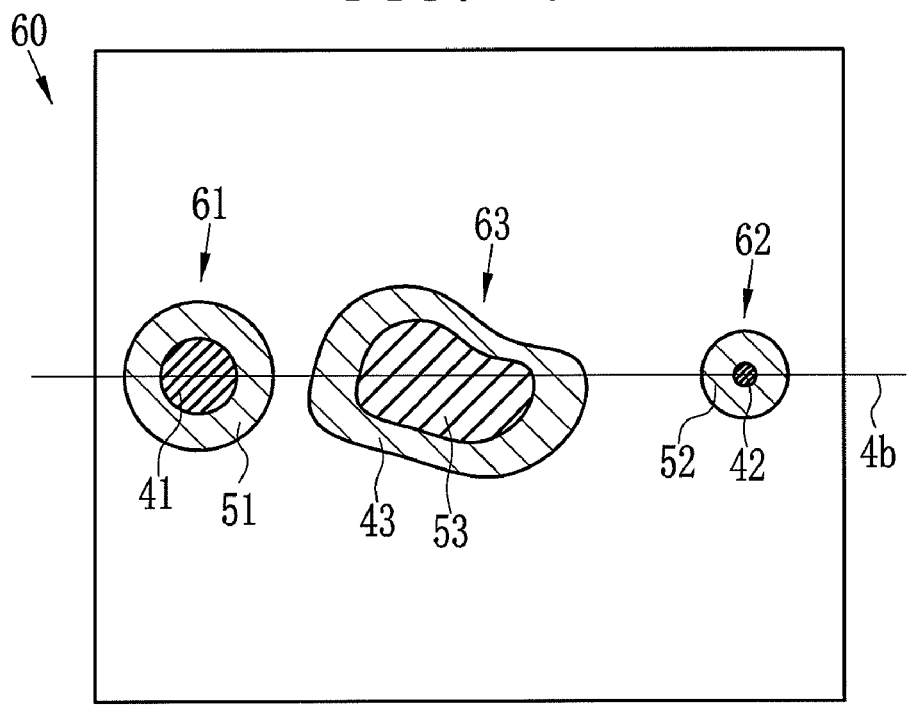
FIG. 4A is an explanation view illustrating a composite image obtained by combining the front side image and the rear side image of the cover glass.
Figure 4B:
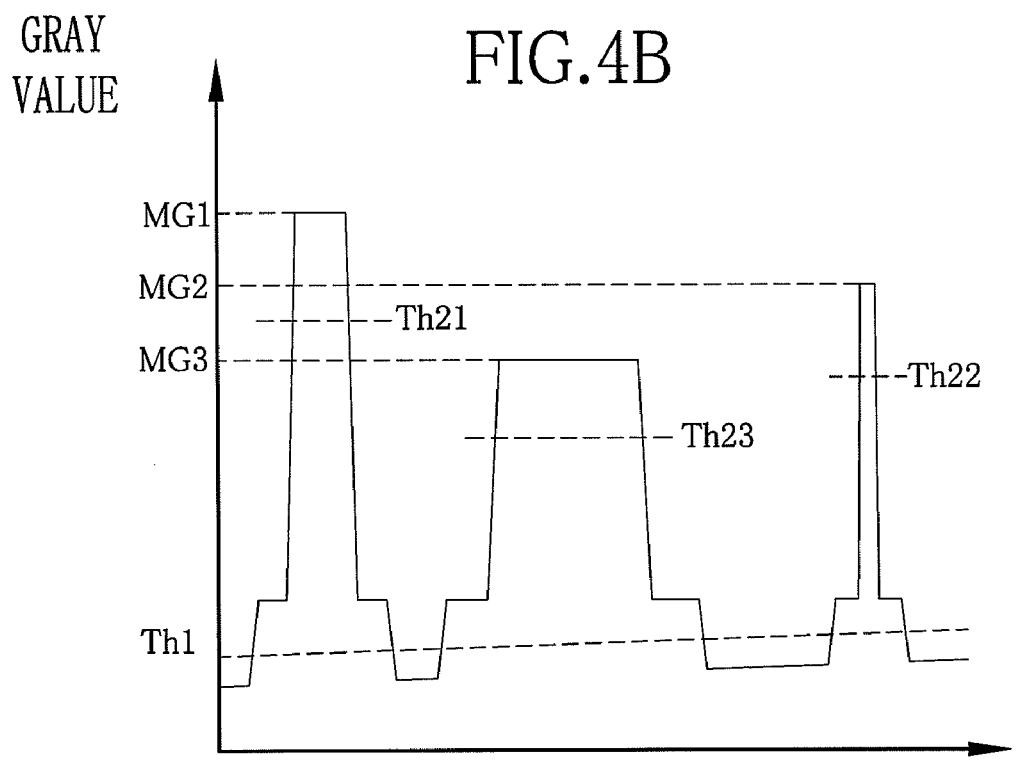
FIG. 4B is a graph showing gray values of pixels on a line 4b in the composite image.

The front side image 40 and the rear side image 50 are combined to create the composite image in the image processing unit 31. The gray values of the same pixel in the front side image and rear side image are added to each other, or the gray values of the same pixel in the front side image and rear side image are subjected to weighting and then added to each other, in order to create the composite image. As shown in FIG. 4A, images 61, 62, and 63 are recorded on a composite image 60. In the image 61, the spot defect image 41 and the blurred image 51 thereof are overlapped with each other. In the image 62, the allowable defect image 42 and the blurred image 52 thereof are overlapped with each other. In the image 63, the stain defect image 53 and the blurred image 43 thereof are overlapped with each other. FIG. 4B shows the gray values of the pixels on a line 4b in the composite image 60. Note that, it is preferable that the positions and sizes of the front side image and the rear side image are corrected before they are combined with each other, to create the composite image.

Next, a defect candidate image, which is considered to be the defect image, is identified on the composite image 60. Firstly, the variation in gray values of pixels in the composite image 60 is calculated. Then, according to the variation in gray values of pixels in the composite image 60, a threshold value is set for each pixel in the composite image 60. The threshold value set for each pixel is hereinafter referred to as a first threshold value Th1 (shown by a dashed line in FIG. 4B). The images 61, 62, and 63 composed of pixels whose gray values exceed the first threshold value Th1 in the composite image 60 are identified as the defect candidate images.

Here, a method for setting the threshold value for each pixel is referred to as dynamic thresholding. The dynamic thresholding is effective in a case where the gray values of pixels in a background fluctuate due to uneven illumination, in a case where the stain defect image or such a defect image having small difference in gray values of pixels from the background, is to be detected, and other cases.

Next, the blurred image 43 is eliminated from the defect candidate image 63, the blurred image 51 is eliminated from the defect candidate image 61, and the blurred image 52 is eliminated from the defect candidate image 62. At first, a maximum gray value MG1 is detected from the gray values of pixels in the defect candidate image 61. Next, the maximum gray value MG1 is multiplied by a preset rate to set a second threshold value Th21 of pixels in the defect candidate image 61. Next, the images composed of pixels having the gray values of less than the second threshold value Th21 are eliminated from the defect candidate image 61. Thus, the blurred image 51 is eliminated from the defect candidate image 61, and only the spot defect image 41 remains in the defect candidate image 61.

For example, in the defect candidate image 61, when the gray value (which is accurately a level shown by 256 gradation expression corresponding to gray) of pixels in the spot defect image 41 is "255" and the gray value of pixels in the blurred image 51 is "120", "255" as the maximum gray value MG1 of pixels in the defect candidate image 61 is multiplied by a preset rate, here 0.8, to obtain "204" as a second threshold value Th21 of pixels in the defect candidate image 61. Then, the blurred image 51 composed of pixels whose gray values are less than the second threshold value Th21, that is "204", is eliminated from the defect candidate image 61.

As to the defect candidate image 62, as in the case of the defect candidate image 61, a second threshold value Th22 is set based on a maximum gray value MG2 of pixels in the defect candidate image 62. Thereafter, the blurred image 52 is eliminated from the defect candidate image 62 such that only the allowable defect image 42 remains in the defect candidate image 62. Further, as to the defect candidate image 63, as in the cases of the defect candidate images 61 and 62, a second threshold value Th23 is set based on a maximum gray value MG3 of pixels in the defect candidate image 63. Then, the blurred image 43 is eliminated from the defect candidate image 63 such that only the stain defect image 53 remains in the defect candidate image 63. As described above, the composite image 60 from which the blurred images 43, 51, and 52 are eliminated are sent to the judging unit 33.

The judging unit 33 performs defect judgment based on the composite image 60 sent from the image processing unit 31. Firstly, the composite image 60 is subjected to a binarization process. Then, the areas of the spot defect image 41, the allowable defect image 42, and the stain defect image 53 are calculated. The areas of the defect images are compared with a preset reference area. As a result of the comparison, in a case where the areas of the defect images exceed the reference area, it is judged that the cover glass 11a has a defect. The comparison result by the judging unit 33 is related with the position of the solid state imaging device 11 on the jig 18, and stored in the RAM 36.

Here, in a case where the reference area is set to not less than the area of the allowable defect image 42 and not more than the area of the blurred image 52 thereof, when each of the front side image 40 and the rear side image 50 is subjected to the defect judgment separately in a conventional manner, the allowable defect image 42 on the front side surface of the cover glass 11a is not judged as the defect, and in contrast, the blurred image 52 thereof on the rear side surface of the cover glass 11a is judged as the defect. Therefore, the cover glass 11a which should be judged as a non-defective product is judged as a defective product. On the contrary, according to the present invention, the front side image 40 and the rear side image 50 are combined with each other to create the composite image 60, and then the defect judgment is performed based on the image obtained by eliminating the blurred image from the composite image 60. Therefore, it is possible to surely detect the defect whose area exceeds the reference area, namely, only the defect which should not be missed other than the allowable defects.

Figure 5:
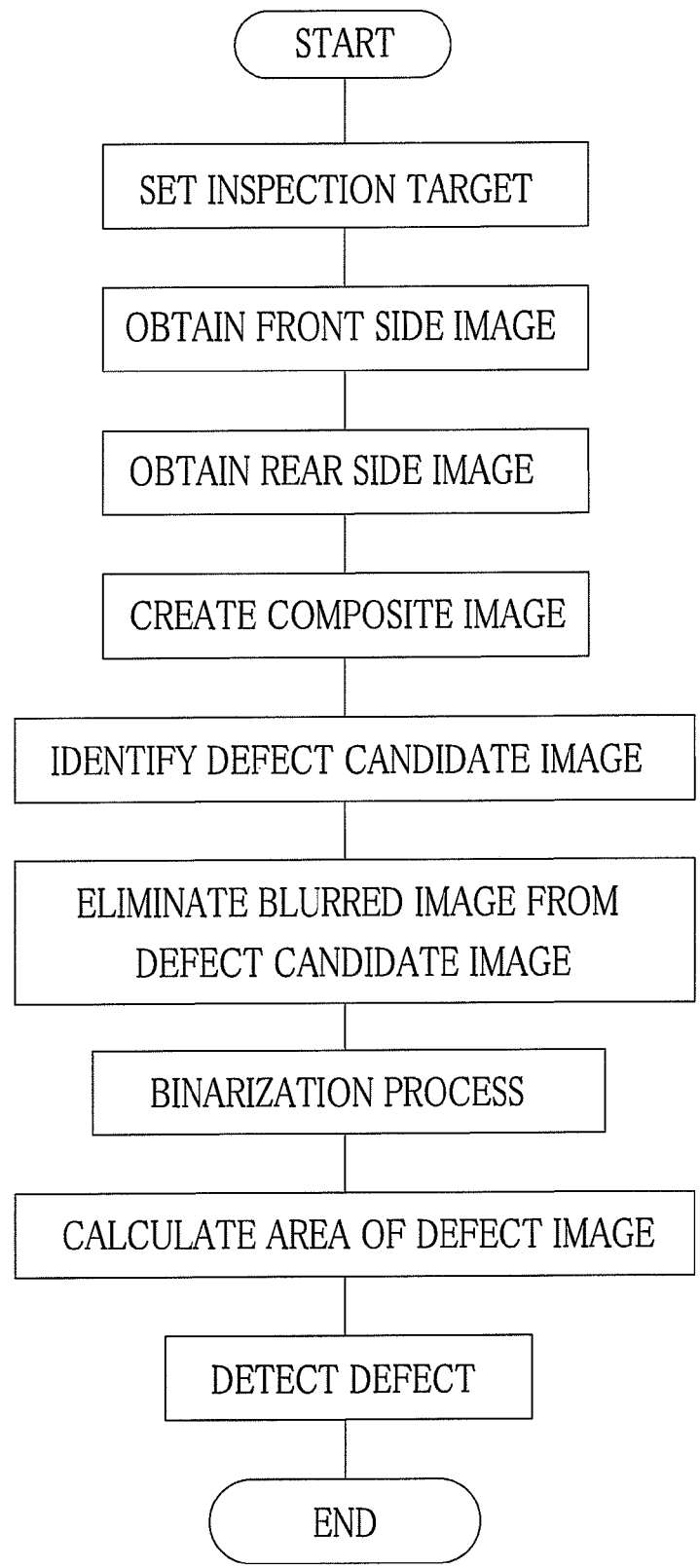
FIG. 5 is a flow chart illustrating a procedure of defect detection.

Next, by referring to a flowchart shown in FIG. 5, the operation of the defect detecting apparatus of the present invention is described. First of all, the solid state imaging device 11 is held by the clamp 20 such that the cover glass 11a as the inspection target faces upward. Next, the XY shift mechanism 15 is activated to move the jig 18 in the X or Y direction by a predetermined distance so as to adjust the optical axis L of the camera 14 to the center of the cover glass 11a.

Next, the focus lens 14a is moved to focus on the front side surface of the cover glass 11a, and the image is captured. The front side imaging signal obtained by the capturing is sent to the image processing unit 31. Upon completion of the capturing of the front side surface of the cover glass 11a, the rear side surface of the cover glass 11a is focused, and the image is captured. The rear side imaging signal obtained by the capturing is sent to the image processing unit 31.

The front side imaging signal and the rear side imaging signal are subjected to the enhancement processing such as the differential processing in the image processing unit 31. The front side image 40 is created based on the front side imaging signal, and the rear side image 50 is created based on the rear side imaging signal. Thereafter, the front side image 40 and the rear side image 50 are combined with each other to create the composite image 60.

Upon creation of the composite image 60, the first threshold value Th1 is set for each pixel by the dynamic thresholding. The pixels whose gray values exceed the first threshold value Th1 are extracted to identify the defect candidate images 61, 62, and 63.

Next, the blurred image 43 is eliminated from the defect candidate image 63, the blurred image 51 is eliminated from the defect candidate image 61, and the blurred image 52 is eliminated from the defect candidate image 62. At first, the maximum gray value MG1 of pixels in the defect candidate image 61 is detected. The maximum gray value MG1 is multiplied by a preset rate to set the second threshold value Th21 of pixels in the defect candidate image 61. Then, the images composed of pixels whose gray values are less than the second threshold value Th21 are eliminated from the composite image 60. Thus, the blurred image 51 is eliminated from the defect candidate image 61, and only the spot defect image 41 remains in the defect candidate image 61.

As to the defect candidate image 62, as in the case of the defect candidate image 61, the second threshold value Th22 is set based on the maximum gray value MG2 of pixels in the defect candidate image 62. Then, the blurred image 52 is eliminated from the defect candidate image 62 such that only the allowable defect image 42 remains in the defect candidate image 62. Further, as to the defect candidate image 63, as in the cases of the defect candidate images 61 and 62, the second threshold value Th23 is set based on the maximum gray value MG3 of pixels in the defect candidate image 63. Then the blurred image 43 is eliminated from the defect candidate image 63 such that only the stain defect image 53 remains in the defect candidate image 63. The composite image 60 from which the blurred images 43, 51, and 52 are eliminated as described above is sent to the judging unit 33.

In the judging unit 33, based on the composite image 60 subjected to the binarization process, the defect judgment is performed. In a case where the areas of the defect images, that is, the areas of the spot defect image 41, the allowable defect image 42, and the stain defect image 53 exceed the reference area, it is judged that the cover glass 11a has a defect. The comparison result by the judging unit 33 is related with the position of the solid state imaging device 11 on the jig 18, and stored in the RAM 36.

Second Embodiment

In a second embodiment of the present invention, there is described defect judgment in a case where one defect candidate image includes two or more kinds of defect images and the blurred images thereof overlapped with each other. Note that except the processing in the image processing unit, the second embodiment is identical to the first embodiment, and therefore its detailed description will be omitted.

Figure 6A:
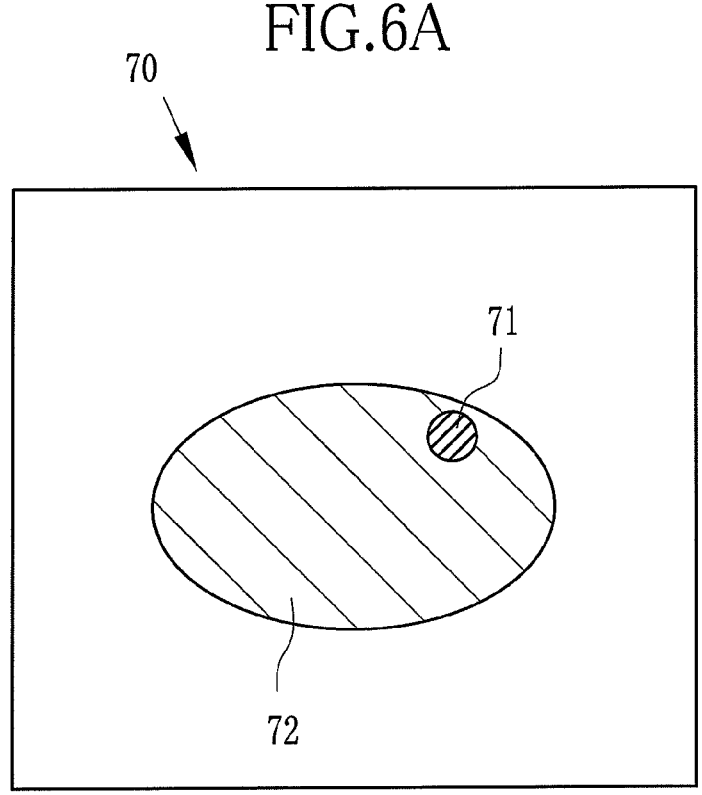
FIG. 6A is an explanation view illustrating a front side image of a cover glass according to a second embodiment.
Figure 6B:
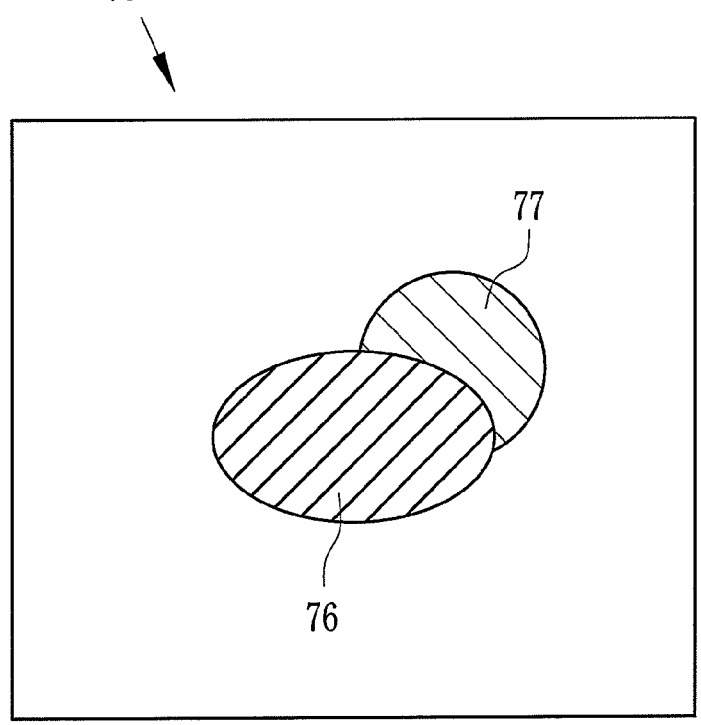
FIG. 6B is an explanation view illustrating a rear side image of the cover glass.

As in the case of the image processing unit 31 of the first embodiment, in the image processing unit 31, the front side image is created based on the front side imaging signal, and the rear side image is created based on the rear side imaging signal, the signals being respectively sent from the camera 14. As shown in FIG. 6A, in a front side image 70, there are recorded the spot defect image 71, and a blurred image 72 caused by the stain defect on the rear side surface of the cover glass 11a. The spot defect image 71 and the blurred image 72 are overlapped with each other on the front side image 70. As shown in FIG. 6B, in a rear side image 75, there are recorded the stain defect image 76, and a blurred image 77 caused by the spot defect on the front side surface of the cover glass 11a. The stain defect image 76 and the blurred image 77 are partially overlapped with each other on the rear side image 75.

Figure 7:
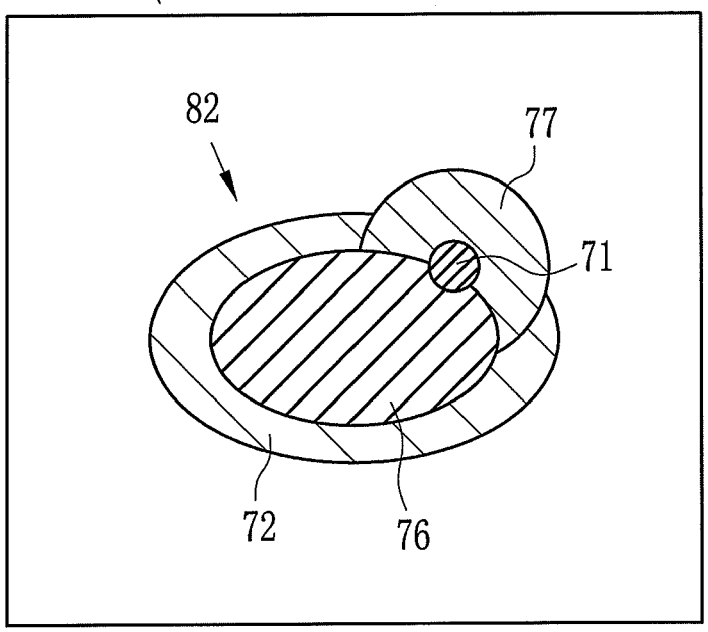
FIG. 7 is an explanation view illustrating a composite image obtained by combining the front side image and the rear side image of the cover glass according to the second embodiment.

The front side image 70 and the rear side image 75 are combined with each other to create a composite image 80 in the image processing unit 31. As shown in FIG. 7, an image 82, in which the spot defect image 71, the blurred image 77 of the spot defect image 71, the stain defect image 76, and the blurred image 72 of the stain defect image 76 are overlapped with each other, is recorded in the composite image 80.

Figure 8:
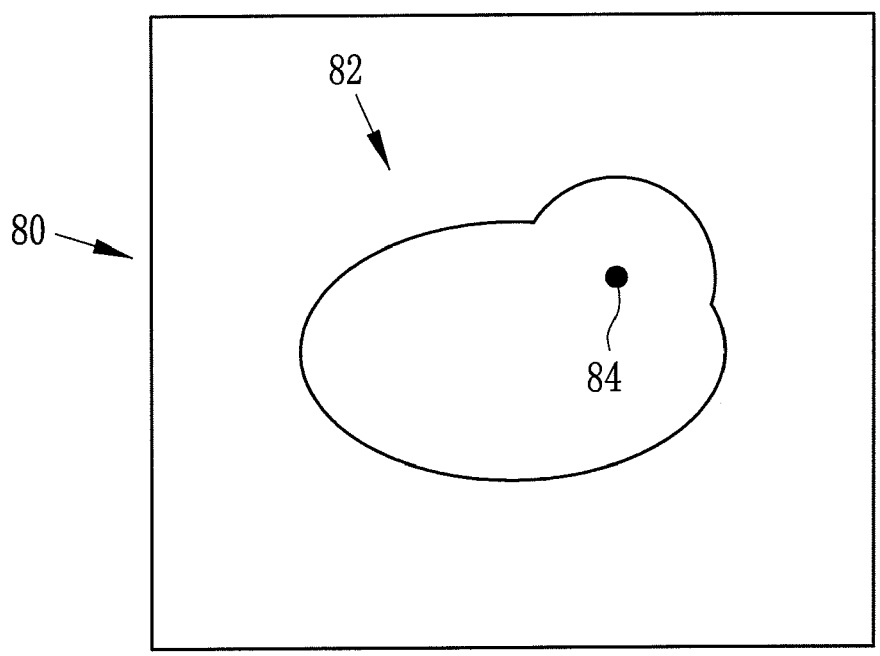
FIG. 8 is an explanation view illustrating a pixel having the maximum gray value in the composite image.
Figure 9:
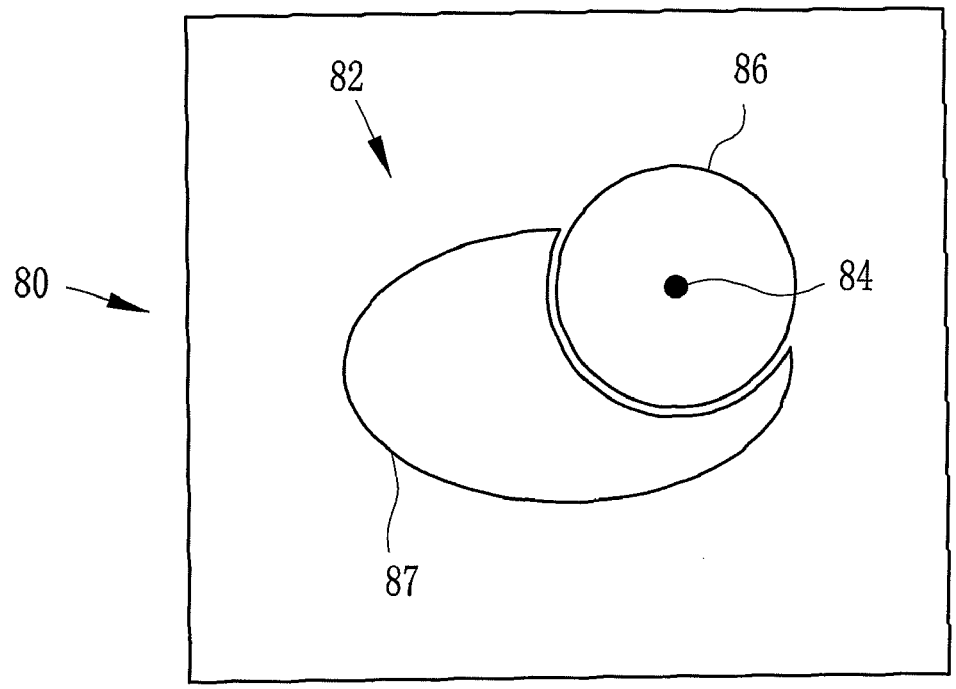
FIG. 9 is an explanation view illustrating the composite image divided into two images.

Upon creation of the composite image 80, by the dynamic thresholding, the first threshold value is set. Then, the image 82 composed of the pixels whose gray values exceed the first threshold value is identified as the defect candidate image in the composite image 80. Next, as shown in FIG. 8, a pixel 84 having the maximum gray value (hereinafter referred to as maximum gray value pixel) is detected among the pixels in the defect candidate image 82. Next, as shown in FIG. 9, the defect candidate image 82 is divided into an image 86 within a predetermined area around the maximum gray value pixel 84 (hereinafter referred to as first defect candidate image) and an image 87 other than the first defect candidate image 86 (hereinafter referred to as second defect candidate image). Note that, in FIGS. 8 and 9, to avoid complexity of the drawing, the defect image and the blurred image are not shown in the drawing.

Figure 10:
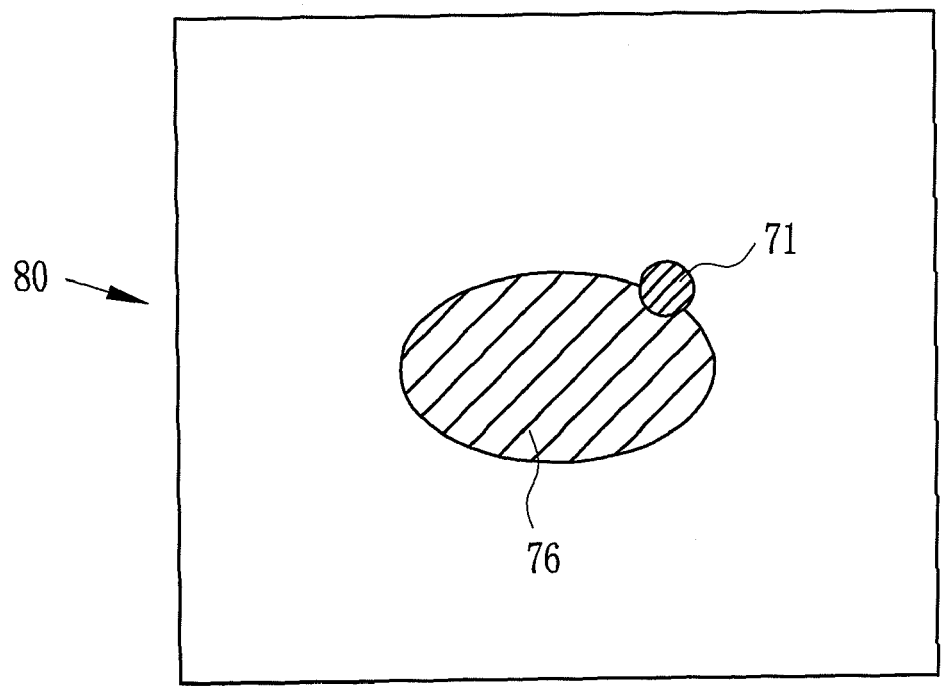
FIG. 10 is an explanation view illustrating the composite image from which a blurred image is eliminated.

Next, the blurred image is eliminated from each of the first and second defect candidate images 86 and 87. First of all, the maximum gray value of pixels in the first defect candidate image 86 is multiplied by a preset rate to set the second threshold value of pixels in the first defect candidate image 86. Next, the image composed of pixels whose gray values are less than the second threshold value is eliminated from the first defect candidate image 86. Thereby, the blurred image 77 is eliminated from the first defect candidate image 86 such that only the spot defect image 71 remains in the first defect candidate image 86. Further, as to the second defect candidate image 87, as in the case of the first defect candidate image 86, the second threshold value is set based on the maximum gray value of pixels in the second defect candidate image 87. Thus, the blurred image 72 is eliminated from the second defect candidate image 87, such that only the stain defect image 76 remains in the second defect candidate image 87. The composite image 80 from which the blurred images 72 and 77 are eliminated, which is shown in FIG. 10, is sent to the judging unit 33.

As described in the first and second embodiments, the capturing from one side of the cover glass has the following advantages in comparison with the capturing from both sides of the cover glass. For example, since the installation of the inspecting device such as a camera becomes easy, it is possible to perform defect inspection in a short period of time. Moreover, since only one camera is necessary to perform the defect inspection, it is possible to reduce the cost taken for the inspecting device. Further, it is also possible to inspect the defect of the cover glass of the package-type solid state imaging device or the like which can be inspected only from one side.

Note that, although the front side image and rear side image of the cover glass are combined with each other in the first and second embodiments, the number of images to be combined is not limited thereto. For example, in a case where the cover glass has an adhesion surface or other intermediate layer to be inspected, it is also possible to focus and capture the intermediate layer or the like and combine the image of the intermediate layer with the front side image and the rear side image. In a case where the front side surface and the rear side surface of the cover glass are not parallel to each other, it is also possible to obtain a plurality of images thereof while changing focal length of the camera and combine the plurality of captured images with each other to crate the composite image.

The defect image and the blurred image thereof recorded on the front side image and rear side image of the cover glass described in the first and second embodiments are taken only as one example, and therefore the present invention is not limited thereto.

Although the target to be inspected is the cover glass of the solid state imaging device in the above embodiments, the present invention is also applicable to a transparent member other than the cover glass. For example, according to the present invention, it is possible to subject a reflection mirror of a Digital Versatile Disc (DVD) recorder to the defect inspection.

The present invention is not to be limited to the above embodiments, and on the contrary, various modifications will be possible without departing from the scope and spirit of the present invention as specified in claims appended hereto.

What is claimed is:

1. A defect detecting apparatus for detecting defects on at least front and rear surfaces of a transparent member, said defect detecting apparatus comprising:
   an imaging device for focusing and imaging each of said surfaces;
   a combining device for combining images of said surfaces obtained by said imaging device so as to create a composite image;
   an eliminating device for eliminating at least one blurred image from said composite image, said blurred image being caused by a defect which resides on one of said surfaces and appears on the other of said surfaces; and
   a defect detecting device for detecting said defect based on said composite image from which said blurred image is eliminated by said eliminating device.

2. A defect detecting apparatus as defined in claim 1, wherein said eliminating device includes:
   a defect candidate image identifying device for identifying a defect candidate image containing an image of said defect and said blurred image in said composite image; and
   a blurred image eliminating device for eliminating said blurred image from said defect candidate image.

3. A defect detecting apparatus as defined in claim 2, wherein said defect candidate image identifying device sets a first threshold value for each pixel in said composite image using dynamic thresholding and identifies an area composed of pixels whose gray values exceed said first threshold value as said defect candidate image.

4. A defect detecting apparatus as defined in claim 3, wherein said blurred image eliminating device detects a maximum gray value of said defect candidate image, and sets a second threshold value by multiplying said maximum gray value by a constant rate, and then eliminates an area composed of pixels whose gray values are less than said second threshold value as said blurred image from said defect candidate image.

5. A defect detecting apparatus as defined in claim 4, wherein said eliminating device further includes:
   a maximum gray value pixel detector for detecting a pixel having a maximum gray value among pixels in said defect candidate image; and
   an image divider for dividing said defect candidate image into a first defect candidate image and a second defect candidate image, said first defect candidate image being a predetermined area around said maximum gray value pixel, and said second defect candidate image being an area other than said first defect candidate image, wherein said blurred image is eliminated from each of said first defect candidate image and said second defect candidate image by said blurred image eliminating device.

6. A defect detecting apparatus as defined in claim 5, wherein said defect is a spot defect, a scratch defect, or a stain defect.

7. A defect detecting method for detecting defects on at least front and rear surfaces of a transparent member, said defect detecting method comprising the steps of:
   focusing and imaging each of said surfaces;
   combining images of said surfaces obtained by said imaging step so as to create a composite image;
   eliminating at least one blurred image from said composite image, said blurred image being caused by a defect which resides on one of said surfaces and appears on the other of said surfaces; and
   detecting said defect based on said composite image from which said blurred image is eliminated by said eliminating step.

8. A defect detecting method as defined in claim 7, wherein said eliminating step includes the steps of:
   identifying a defect candidate image containing an image of said defect and said blurred image in said composite image; and
   eliminating said blurred image from said defect candidate image.

9. A defect detecting method as defined in claim 8, wherein said defect candidate image identifying step includes the step of setting a first threshold value for each pixel in said composite image using dynamic thresholding, and the step of identifying an area composed of pixels whose gray values exceed said first threshold value as said defect candidate image.

10. A defect detecting method as defined in claim 9, wherein said blurred image eliminating step includes the step of detecting a maximum gray value of said defect candidate image, the step of setting a second threshold value by multiplying said maximum gray value by a constant rate, and the step of eliminating an area composed of pixels whose gray values are less than said second threshold value as said blurred image from said defect candidate image.

11. A defect detecting method as defined in claim 10, wherein said eliminating step further includes the steps of:
   detecting a pixel having a maximum gray value among pixels in said defect candidate image; and
   dividing said defect candidate image into a first defect candidate image and a second defect candidate image, said first defect candidate image being a predetermined area around said maximum gray value pixel, and said second defect candidate image being an area other than said first defect candidate image, wherein
said blurred image is eliminated from each of said first defect candidate image and said second defect candidate image by said blurred image eliminating step.

12. A defect detecting method as defined in claim 11, wherein said defect is a spot defect, a scratch defect, or a stain defect.

* * * * *